United States Patent [19]

Christodoulou et al.

[11] Patent Number: 4,915,904

[45] Date of Patent: * Apr. 10, 1990

[54] PROCESS FOR STABILIZATION OF TITANIUM SILICIDE PARTICULATES WITHIN TITANIUM ALUMINIDE CONTAINING METAL MATRIX COMPOSITES

[75] Inventors: Leontios Christodoulou, Baltimore, Md.; James C. Williams, Cincinnati, Ohio; Michael A. Riley, Belcamp, Md.

[73] Assignee: Martin Marietta Corporation, Bethesda, Md.

[ * ] Notice: The portion of the term of this patent subsequent to Dec. 1, 2004 has been disclaimed.

[21] Appl. No.: 249,021

[22] Filed: Sep. 26, 1988

Related U.S. Application Data

[63] Continuation-in-part of Ser. No. 873,890, Jun. 13, 1986, Pat. No. 4,774,052, which is a continuation-in-part of Ser. No. 662,928, Oct. 19, 1984, abandoned.

[51] Int. Cl.$^4$ .................... C22C 1/00; C22C 32/00
[52] U.S. Cl. .................... 420/418; 148/407; 148/415; 420/552; 420/590
[58] Field of Search .............. 420/129, 590, 418, 552; 148/421, 437, 407, 415

[56] References Cited

U.S. PATENT DOCUMENTS 4,710,348 12/1987 Brupacher et al. ................. 420/129
4,774,052 9/1988 Nagle et al. .......................... 420/129

Primary Examiner—L. Dewayne Rutledge
Assistant Examiner—David W. Schumaker
Attorney, Agent, or Firm—Herbert W. Mylius; Gay Chin

[57] ABSTRACT

This invention relates to a metallic-second phase composites comprising a matrix of titanium aluminide with discrete titanium silicide particles dispersed therein. The second phase dispersoid is stabilized during the process of in-situ formation by the presence of zirconium.

3 Claims, No Drawings

PROCESS FOR STABILIZATION OF TITANIUM SILICIDE PARTICULATES WITHIN TITANIUM ALUMINIDE CONTAINING METAL MATRIX COMPOSITES

CROSS REFERENCE TO RELATED APPLICATIONS

This application is a Continuation-In-Part of U.S. patent application Ser. No. 873,890, filed June 13, 1986, now U.S. Pat. No. 4,774,052 which is a Continuation-In-Part of U.S. patent application Ser. No. 662,928, filed Oct. 19, 1984, now abandoned.

FIELD OF THE INVENTION

The present invention relates to composite materials comprising titanium aluminide matrices having titanium silicide second phase particles dispersed therein. The process for formation of the titanium aluminide-titanium silicide composites of the present invention involves either the direct synthesis of titanium silicide second phase particles within the final titanium aluminide containing matrix desired, or synthesis of the titanium silicide particles within an aluminum or titanium matrix which may then be converted to the final titanium aluminide containing matrix sought. According to the present invention, zirconium is utilized as an alloying addition to stabilize the titanium silicide particles during processing.

BACKGROUND OF THE INVENTION

Intermetallic materials have been of considerable interest and have undergone increasing development over the past several years, especially the intermetallics of aluminum such as the aluminides of titanium, zirconium, iron, cobalt, and nickel. The need for the advanced properties obtainable with intermetallic materials is typified by their potential application to structures capable of withstanding high temperatures, such as turbine engines. In designing and operating turbine engines today, and for the foreseeable future, there are two primary problems which demand solutions from the field of materials science. The first of these is the need to operate certain portions of the engine at higher temperatures to improve operating efficiency and save fuel. The second problem is the need for lighter materials to decrease engine weight and engine operating stresses due to heavy rotating components, and to increase the operating life of disks, shafts, and bearing support structures. These latter structures require materials which are less dense than conventional nickel base superalloys, but which possess roughly the same mechanical properties and oxidation resistance as those materials in current usage.

Intermetallic compounds are particularly suited to these needs because of properties which derive from the fact that they possess ordered structures having regularly repeating (e.g., A B A B A B) atom sequencing. Modulus retention at elevated temperature in these materials is particularly high because of strong A-B bonding. In addition, a number of high temperature properties which depend on diffusive mechanisms, such as creep, are improved because of the generally high activation energy required for self-diffusion in ordered alloys.

The formation of long range order in alloy systems also frequently produces a significant positive effect on mechanical properties, including elastic constants, strength, strain-hardening rates, and resistance to cyclic creep deformation. Finally, in the case of titanium aluminides, the resistance to surface oxidation is particularly good because these materials contain a large reservoir of aluminum that is preferentially oxidized.

However, during metallurgical processing, one problem encountered is that these materials tend to form coarse grains, which adversely effect workability, and which degrade certain mechanical properties, the most important of which is ductility. Also, in many intermetallics the strong A-B bonding results in low temperature brittleness, although the exact mechanism of the ductile-brittle transition seems to be different for the different intermetallic compounds. It is thus necessary to address the problem of minimal low temperature ductility without destroying the inherent high temperature strength and stiffness. In the prior art it has generally been considered that these latter high temperature properties may only be retained by preserving the ordered structure. However, little progress has been made in developing practical intermetallic compositions that possess sufficiently improved low temperature ductility while maintaining high temperature strength.

Another class of materials which has been extensively developed over the past several years comprises metal-second phase composites, such as aluminum reinforced with carbon, boon, silicon carbide, silica, or alumina fibers, whiskers, or particles. Metal-ceramic composites with good high temperature yield strengths and creep resistance have been fabricated by the dispersion of very fine (less than 0.1 micron) oxide or carbide particles throughout the metal or alloy matrix. However, the formation of composites comprising intermetallic matrices has not been widely investigated. Moreover, the formation of high quality composites comprising titanium aluminide matrices having titanium silicide intermetallic particles dispersed therein has not heretofore been achieved.

Conventional powder metallurgy techniques for the production of dispersion-strengthened composites involve the mechanical mixing of metal powders of approximately 5 micron diameter or less with powder of the second phase material (preferably 0.01 micron to 0.1 micron). High speed blending techniques or procedures such as ball milling may be used to mix the powders. Standard consolidation techniques are then employed to form the final composite. Typically, however, the second phase component is large, i.e. greater than 1 micron, due to a lack of availability, and high cost, of very small particle size materials since their production is energy intensive, time consuming, and costly in capital equipment. Furthermore, the production, mixing and consolidation of very small particles inevitably leads to contamination at the surface of the particles. Contaminants, such as oxides, inhibit interfacial binding between the second phase and the matrix, thus adversely effecting ductility of the composite. Such weakened interfacial contact can also result in reduced strength, loss of elongation, and facilitated crack propagation. In addition, the matrix may be adversely effected, as in the case of titanium which is embrittled by interstitial oxygen.

Alternatively, it is known that proprietary processes exist for the direct addition of appropriately coated ceramics to molten metals. Further, molten metal infiltration of a continuous ceramic skeleton has been used to produce composites. In most cases, elaborate particle coating techniques have been developed to protect the ceramic particles from the molten metal during admixture or molten metal infiltration, and to improve bonding between the metal and ceramic. Techniques such as these have resulted in the formation of silicon carbide-aluminum composites, frequently referred to as SiC/Al, or SiC aluminum. This approach is only suitable for large particulate ceramics (e.g., greater than 1 micron) and whiskers, because of the high pressures involved for infiltration. In the molten metal infiltration technique, the ceramic material, such as silicon carbide, is pressed to form a compact, and liquid metal is forced into the packed bed to fill the intersticies. Such a technique is illustrated in U.S. Pat. No. 4,444,603, of Yamatsuta et al, issued Apr. 24, 1984. Because of the necessity for coating techniques and molten metal handling equipment capable of generating extremely high pressures, molten metal infiltration has not been a practical process for making metal-second phase composites.

The above noted powder metallurgical and molten metal techniques have not been applied to the production of composites comprising titanium silicide particles dispersed in titanium aluminide matrices, due to the fact that titanium silicide powders in the micron size range are not readily available. In addition, it has not been considered practical to utilize titanium silicide particles within titanium containing matrices since titanium is known to be highly reactive, especially at elevated temperatures. Thus, one would expect titanium silicide particles to be highly unstable within a titanium containing environment.

In recent years, numerous ceramics have been formed using a process referred to as self-propagating high-temperature synthesis (SHS), which involves an exothermic, self-sustaining reaction which propagates through a mixture of compressed powders. The SHS process involves mixing and compacting powders of the constituent elements, and igniting the green compact with a suitable heat source. On ignition, sufficient heat is released to support a self-sustaining reaction, which permits the use of sudden, low power initiation of high temperatures, rather than bulk heating over long times at lower temperatures. Exemplary of these techniques are the patents of Merzhanov et al. In U.S. Pat. No. 3,726,643, there is taught a method for producing high-melting refractory inorganic compounds by mixing at least one metal selected from groups IV, V, and VI of the Periodic System with a non-metal such as carbon, boron, silicon, sulfur, or liquid nitrogen, and locally heating the surface of the mixture to produce a local temperature adequate to initiate a combustion process. In U.S. Pat. No. 4,161,512, a process is taught for preparing titanium carbide by localized ignition of a mixture consisting of 80-88 percent titanium and 20-12 percent carbon, resulting in an exothermic reaction of the mixture under conditions of layer-by-layer combustion. These references deal with the preparation of ceramic materials, in the absence of a metallic phase.

U.S. Pat. No. 4,431,448 teaches preparation of a hard alloy by intermixing powders of titanium, boron, carbon, and a Group I-B binder metal, such as copper or silver, compression of the mixture, local ignition thereof to initiate the exothermic reaction of titanium with boron and carbon, and propagation of the reaction, resulting in an alloy comprising titanium diboride, titanium carbide, and the binder metal. This reference is limited to the formation of TiB$_2$ and TiC ceramic materials and to the use of Group I-B metals such as copper and silver, as binders. The process is performed with a relatively high volume fraction of ceramic and a relatively low volume fraction of metal (typically 6 volume percent and below, and almost invariably below 20 volume percent). The product is a dense, sintered material wherein the relatively ductile metal phase acts as a binder or consolidation aid which, due to applied pressure, fills voids, etc., thereby increasing density.

U.S. Patent Application Ser. No. 873,890, filed June 13, 1986, of which this application is a Continuation-In-Part, and which is hereby incorporated by reference, discloses several methods for the production of intermetallic-second phase composites. Emphasis is drawn to the production of composites consisting of aluminide matrices having ceramic particles dispersed therein. While the application does disclose the formation of intermetallic second phase particles within aluminide matrices, no specific disclosure is made of the formation of titanium silicide intermetallic particles within a titanium aluminide containing matrix. The methods taught in the 873,890 application may be adapted for use in the present invention, wherein zirconium alloying additions are utilized during processing to stabilize titanium silicide particles within titanium aluminide containing matrices.

U.S. patent application Ser. No. 190,561, filed May 5, 1988, which is hereby incorporated by reference, discloses a method for the production of intermetallic-second phase composites that is related to the methods taught in the 873,890 application discussed above, but which involves the use of additional processing steps. As in the 873,890 application, the formation of composites comprising intermetallic second phase particles within aluminide matrices is taught. However, no specific disclosure is made of the production of titanium aluminide-titanium silicide composites utilizing zirconium alloying additions. The methods taught in the 190,561 application may also be adapted for use in the present invention, wherein zirconium is used as an alloying addition during processing.

Similarly, U.S. Pat. Nos. 4,710,348 and 4,751,048, and U.S. patent application Ser. Nos. 927,014; 927,031; and 190,547, which are hereby incorporated by reference, disclose various methods for the production of metallic-second phase composites. However, none of these patents and patent applications teach the formation of composites comprising titanium aluminide containing matrices having titanium silicide particles dispersed therein.

SUMMARY OF THE INVENTION

It is an object of the present invention to provide a metallic-second phase composite comprising a titanium aluminide containing matrix having discrete titanium silicide intermetallic particles dispersed therein.

It is a further object of the present invention to provide a method for forming composite materials comprising titanium aluminide containing matrices having titanium silicide particles dispersed therein which utilizes zirconium as an alloying addition during processing.

It is a further object of this invention to provide a method for dispersion strengthening titanium aluminides by forming a dispersion of in-situ precipitated titanium silicide intermetallic particles within a titanium aluminide containing matrix.

It is yet a further object of the invention to produce a composite comprising a titanium aluminide containing matrix which has fine grain size for improved ductility and mechanical properties while substantially retaining the high temperature characteristics of the material.

It is also an object of the present invention to provide a titanium aluminide containing composite material which may be subjected to conventional metallurgical processing steps, such as remelting, welding, heat treating, working, forging, extruding, rolling, etc.

The advantages of the present invention will become more readily understood by consideration of the following description and examples.

DESCRIPTION OF THE PREFERRED EMBODIMENTS

The present invention relates to the production of composites comprising titanium aluminide containing matrices having stable titanium silicide intermetallic particulates dispersed therein. It has been found that the use of zirconium alloying additions during the production of such titanium aluminide-titanium silicide composites reduces the tendency of the titanium silicide particles to dissolve during processing.

The method of forming titanium silicide particles within a titanium aluminide containing matrix involves either the direct synthesis of titanium silicide particles within the final titanium aluminide containing matrix desired, or synthesis of the titanium silicide particles within an aluminum or titanium containing matrix which may then be converted to the final titanium aluminide containing matrix sought. Zirconium is utilized as an alloying addition to stabilize the titanium silicide particles during processing. Accordingly, the present invention involves the reaction of titanium and silicon in the presence of a solvent metal to form a dispersion of titanium silicide particles within a matrix of the solvent metal. The solvent metal may be selected from (1) aluminum; (2) titanium in combination with zirconium; and (3) aluminum in combination with titanium and zirconium. In cases (1) and (2), at least one further step is required to convert the solvent metal matrix to the final titanium aluminide containing matrix desired. In case (3), the final titanium aluminide containing matrix sought may be directly produced during the titanium silicide forming reaction. Specific techniques for the formation of second phase particles within solvent metal matrices and for the conversion of metal and metal alloy matrices to intermetallic containing matrices are given in previously cited U.S. Pat. Nos. 4,710,348 and 4,751,048 and U.S. patent application Ser. Nos. 873,890; 927,014; 927,031; 190,547 and 190,561, incorporated by reference. These techniques may be used in conjunction with the present invention to form a specific family of titanium aluminide-titanium silicide composite materials containing zirconium.

In accordance with the present invention, the titanium aluminide matrix may be selected from single phase $Ti_3Al$, $TiAl$ or $TiAl_3$, or may comprise a two phase mixture of $Ti_3Al$ and $TiAl$, or $TiAl$ and $TiAl_3$.

The titanium silicide particles may be selected from $Ti_3Si$, $Ti_5Si_3$, $Ti_5Si_4$, $TiSi$ and $TiSi_2$. A preferred titanium silicide is $Ti_5Si_3$, due to its relatively high melting temperature (2130° C.) and stability over a relatively broad stoichiometric range (Si may range from 35.5 to 39.5 atomic percent in $Ti_5Si_3$). The size of the titanium silicide particles may range from about 0.1 to about 20 microns, and more preferably may range from about 1 to about 10 microns. A wide range of titanium silicide particle loadings are possible in the composites of the present invention. The percentage of particles may be varied considerably, depending upon the intended use of the final composite material. For dispersion strengthening purposes, titanium silicide particle loadings of from about 1 to about 40 volume percent may be utilized. For grain refining applications, particle loadings of from about 1 to about 10 volume percent may be used.

Zirconium is present in the composites of the present in amounts ranging from about 1.5 to about 4 atomic percent, and more preferably from about 2 to about 3 atomic percent. It is noted that zirconium is primarily utilized in the present invention to stabilize the titanium silicide particles during processing. Absent the presence of zirconium, an undesirable amount of titanium silicide dissolution may occur during the composite formation process, due to the highly reactive nature of the molten titanium which is present. It has been found that the use of zirconium minimizes the extent to which the titanium silicide particles are dissolved. In selecting the amount of zirconium to be utilized, it is generally desirable to use the minimum amount which prevents unwanted particle dissolution. The use of amounts greater than that needed to stabilize the titanium silicide particles is usually not necessary, since appreciable property benefits are not gained by the presence of additional zirconium.

It is noted that the titanium aluminide containing matrices of the present invention exhibit relatively fine grain size. For instance, an as-cast ingot comprising TiAl (gamma) intermetallic reinforced with 5 volume percent $Ti_5Si_3$ second phase particles may exhibit an average colony size of below 50 microns. The fine grain size achievable by the the present invention is thought to increase ambient temperature ductility of the titanium aluminide matrices by reducing dislocation stress at grain boundaries as a result of reduced slip length. Fine grain size also results in a larger number of suitably oriented grains for dislocation activity, an effective means of improving ductility. In addition, fine grain size is a critical factor in increasing fabricability of the material.

While the terms "titanium aluminide containing matrix" and "titanium aluminide matrix" are used in this disclosure to define a matrix which comprises $Ti_3Al$, $TiAl$, $TiAl_3$ or combinations thereof, zirconium is also present within the matrix. Also, other materials, such as the individual constituents of the titanium aluminide, or additional alloying metals, may also be present in lesser amounts. The titanium aluminide matrix may also contain additional phases such as retained beta (B) or ordered beta (B2). Furthermore, the titanium aluminide matrix may have a number of substitutional or interstitial elements present. For example, oxygen may be present in a TiAl matrix.

In accordance with the present invention, various techniques may be used to form titanium silicide particles within aluminum and/or titanium containing matrices. Each of these techniques involves the preparation of a mixture of titanium and silicon, along with at least one solvent metal selected from aluminum and titanium. In cases where titanium is used as a solvent metal, zirconium is also present in the mixture. The mixture is then reacted by the techniques described below to form a dispersion of titanium silicide particles within the solvent metal matrix. In each of the following embodiments, the titanium and silicon constituents may be provided in the form of elemental powders, or at least one may be provided in the form of an alloy with the solvent metal.

In one technique, the titanium silicide forming reaction is initiated by bulk heating a mixture comprising the silicon and titanium constituents and at least one solvent metal selected from aluminum and titanium. In accordance with the bulk heating process, the starting mixture is preferably compressed to form a compact which is then heated in, for example, a furnace to initiate the titanium silicide forming reaction. The reaction typically occurs at a temperature approximating the melting temperature of the solvent metal. Bulk heating may also be achieved by plasma spray techniques in which the starting mixture is introduced into a plasma flame. The starting mixture may be in the form of elemental or mechanically alloyed powders. U.S. Pat. No. 4,710,348 to Brupbacher et al, incorporated by reference, gives a detailed description of bulk heating techniques which are adaptable for use in producing the titanium silicide containing composites of the present invention.

In an alternative embodiment, composites comprising titanium silicide particles dispersed in a solvent metal matrix are formed using a local ignition process. In this process a mixture comprising the titanium and silicon constituents and at least one solvent metal selected from aluminum and titanium is compressed to form a green compact, followed by local ignition to initiate a reaction wave front which moves along the compact. The propagating reaction results in the in-situ precipitation of titanium silicide particles in the solvent metal matrix. U.S. patent application Ser. No. 927,014, filed Nov. 5, 1986, which is incorporated by reference, gives a detailed description of local ignition techniques which are adaptable for the formation of the titanium silicide containing composites of the present invention.

Another alternative embodiment for the initiation of the titanium silicide forming reaction involves a direct addition process. In this approach, a mixture comprising the titanium and silicon constituents and at least one solvent metal selected from aluminum and titanium is added to a molten bath comprising an additional amount of the solvent metal, resulting in the in-situ formation of titanium silicide particles within a matrix of the solvent metal. The mixture may be added to the molten solvent metal in the form of a preform or compact. U.S. patent application Ser. No. 927,031, filed Nov. 5, 1986, which is incorporated by reference, gives a detailed description of direct addition techniques which may be adapted to the formation of the titanium silicide containing composites of the present invention.

The techniques discussed above may be used to directly form the final titanium aluminide-titanium silicide composites desired. In this case, aluminum, titanium, silicon and zirconium are provided as starting materials in the proper proportions to form titanium aluminide and titanium silicide in the desired stoichiometries. Zirconium is provided in an amount sufficient to prevent unwanted dissolution of the titanium silicide particles.

Alternatively, it may be desirable to use the techniques described above to form the titanium silicide particles in either an aluminum or titanium solvent metal matrix and to subsequently convert this solvent metal matrix to the final titanium aluminide containing matrix sought. For example, $Ti_5Si_3$ particles may be formed in an aluminum solvent metal matrix which is subsequently reacted with a titanium-zirconium mixture to form a titanium aluminide containing matrix. A first composite, produced by the above noted techniques, comprising either an aluminum or titanium solvent metal matrix may be converted to a second composite comprising a titanium aluminide matrix by several methods. The first composite may be added in solid form to a molten bath of metal. In this case, the first composite may be crushed to a convenient size and then added to a melt of the metal. Dispersion of the titanium silicide particles in the melt may be facilitated by melt agitation generated by mechanical stirring, gas bubbling, induction stirring, ultrasonic energy, and the like. In an alternative method, the first composite and additional metal are placed together in solid form, followed by heating to melt the metals and to disperse the titanium silicide particles within the molten titanium-/aluminum metal mixture. Heating may be achieved in any suitable device, such as a furnace or casting unit. A particularly preferred technique is to use an arc-melting device to effect heating of the mixture of the first composite and additional metal. In this instance, an electrode is formed consisting of a compact of the first composite and additional metal which is then arc-melted in a conventional manner. It is noted that in the process of converting the titanium or aluminum solvent metal matrix to the final titanium aluminide matrix desired, zirconium must be present in order to reduce dissolution of the titanium silicide particles. During the conversion process it is also possible to add additional alloying metals other than zirconium. U.S. Pat. No. 4,751,048, issued June 14, 1988, which is incorporated by reference, gives a detailed description of dilution techniques which are adaptable for use in the process of the present invention.

When produced in the form of ingots or billets, the final titanium aluminide-titanium silicide composites of the present invention may then be subjected to conventional metallurgical processing steps, such as remelting, heat treating, working, forging, extruding, rolling, etc. In addition, the ingots or billets may be remelted and rapidly solidified to produce a powder which may then be spray formed, plasma spray deposited, etc.

The following examples illustrate various aspects of the present invention.

EXAMPLE 1

Titanium, silicon and aluminum powders are mixed in the proper stoichiometric proportions to provide 50 volume percent $Ti_5Si_3$ second phase in an aluminum solvent metal matrix. The mixture is then packed in gooch tubing and isostatically pressed to 40 ksi, forming a compact which is then heated in a furnace under argon at atmospheric pressure to initiate a reaction of the titanium and silicon. A first composite is thereby formed comprising an aluminum solvent metal matrix having $Ti_5Si_3$ particles dispersed therein. The average size of the $Ti_5Si_3$ particles is approximately 5 microns. This first composite is then crushed and blended with titanium and aluminum powders in the proper ratio to produce a final composite comprising 10 volume percent $Ti_5Si_3$ particles within a Ti-45Al matrix. Zirconium powder is then blended with this mixture in an amount equal to 3 atomic percent of the total mixture. The mixture is packed in gooch tubing and isostatically pressed to 40 ksi to form a compact which is then heated under argon at atmospheric pressure to form a final composite. Analysis of the final composite material reveals a Ti-45Al matrix containing zirconium and having titanium silicide particles dispersed therein. The titanium silicide particles have an average size of approximately 5 microns and are believed to be composed of $Ti_5Si_3$

EXAMPLE 2

Titanium, silicon and aluminum powders are mixed in the proper stoichiometric proportions to provide 30 volume percent $Ti_5Si_3$ second phase in a Ti-45Al matrix. Zirconium powder is blended with this mixture in an amount equal to 3 atomic percent of the total mixture. The mixture is then packed in gooch tubing and isostatically pressed to 40 ksi, forming a compact which is then heated in a furnace under argon at atmospheric pressure to initiate a reaction of the titanium and silicon. The final composite material formed comprises titanium silicide particles dispersed within a matrix containing Ti-45Al and zirconium.

It should be noted that the process disclosed herein for making titanium aluminide-titanium silicide composites has a number of advantages over previously disclosed techniques for preparing intermetallic composite materials. For example, the present invention provides a means for stabilizing titanium silicide particles within titanium aluminide containing matrices. Compared to prior art powder metallurgy techniques, the present process circumvents the need for micron sized, unagglomerated titanium silicide particles, which particles are not commercially available. The present process also eliminates the technical problems of uniformly dispersing second phase particles in an intermetallic, and avoids the problem of oxides at the intermetallic-second phase interface. The composites of the present invention have improved high temperature stability, since the second phase is substantially non-reactive with the matrix. As a result, the composites can be remelted and recast while maintaining relatively uniformly dispersed discrete fine particles. Further, composites of the present invention are also capable of being formed by conventional ingot metallurgy techniques such as extruding, forging and rolling.

It is understood that the above description of the present invention is susceptible to considerable modification change, and adaptation by those skilled in the art, and such modifications, changes, and adaptations are intended to be considered to be within the scope of the present invention, which is set forth by the appended claims.

We claim:

1. A method for forming a final composite material comprising titanium silicide particles within a titanium aluminide containing matrix, the method comprising contacting titanium, silicon and aluminum at a temperature sufficient to initiate a reaction between the titanium and silicon to thereby form a first composite comprising titanium silicide particles dispersed within an aluminum matrix; admixing the first composite with titanium and zirconium to form a mixture; heating the mixture to a temperature sufficient to convert at least a portion of the aluminum matrix to titanium aluminide; and recovering a final composite material comprising titanium silicide particles dispersed within a titanium aluminide containing matrix.

2. The method of claim 1, wherein the first composite is admixed with aluminum in addition to titanium and zirconium.

3. A method for forming a final composite material comprising titanium silicide particles within a titanium aluminide containing matrix, the method comprising contacting titanium, silicon, aluminum and zirconium at a temperature sufficient to initiate a reaction between the titanium and silicon to thereby form a final composite comprising titanium silicide particles dispersed within a matrix comprising titanium aluminide and zirconium.

* * * * *